United States Patent
Mullins et al.

(10) Patent No.: US 8,756,441 B1
(45) Date of Patent: Jun. 17, 2014

(54) DATA CENTER ENERGY MANAGER FOR MONITORING POWER USAGE IN A DATA STORAGE ENVIRONMENT HAVING A POWER MONITOR AND A MONITOR MODULE FOR CORRELATING ASSOCIATIVE INFORMATION ASSOCIATED WITH POWER CONSUMPTION

(75) Inventors: James A. Mullins, County Cork (IE); Alan T. Cooney, County Cork (IE); Brendan T. Butler, County Cork (IE); Ger V. Hallissey, County Cork (IE); Derek A. Barrett, County Cork (IE); John Carmody, County Cork (IE); Paul O'Keeffe, Cork (IE); Pat J. Healy, County Cork (IE); Lisa O'Mahony, Cork (IE); Philip Sheehan, Cork (IE)

(73) Assignee: EMC Corporation, Hopkinton, MA (US)

( * ) Notice: Subject to any disclaimer, the term of this patent is extended or adjusted under 35 U.S.C. 154(b) by 572 days.

(21) Appl. No.: 12/894,660

(22) Filed: Sep. 30, 2010

(51) Int. Cl.
*G06F 1/00* (2006.01)
*G06F 9/00* (2006.01)

(52) U.S. Cl.
USPC .............. 713/300; 713/2; 713/310; 713/320

(58) Field of Classification Search
USPC ............. 713/300, 320, 340, 310, 324, 322, 2; 703/1; 702/188, 182; 718/1; 700/98
See application file for complete search history.

(56) References Cited

U.S. PATENT DOCUMENTS

| | | | |
|---|---|---|---|
| 8,160,838 B2* | 4/2012 | Ramin et al. | 702/188 |
| 2006/0112286 A1* | 5/2006 | Whalley et al. | 713/300 |
| 2006/0230295 A1* | 10/2006 | Schumacher et al. | 713/300 |
| 2007/0038414 A1* | 2/2007 | Rasmussen et al. | 703/1 |
| 2007/0245161 A1* | 10/2007 | Shaw et al. | 713/300 |
| 2008/0004837 A1* | 1/2008 | Zwinger et al. | 702/182 |
| 2008/0269932 A1* | 10/2008 | Chardon et al. | 700/98 |
| 2009/0132842 A1* | 5/2009 | Brey et al. | 713/322 |
| 2009/0138734 A1* | 5/2009 | Uchida | 713/310 |
| 2011/0055602 A1* | 3/2011 | Kamay et al. | 713/320 |
| 2011/0072293 A1* | 3/2011 | Mazzaferri et al. | 713/340 |
| 2011/0173465 A1* | 7/2011 | Akers et al. | 713/310 |
| 2011/0185356 A1* | 7/2011 | Shetty et al. | 718/1 |
| 2011/0213997 A1* | 9/2011 | Kansal et al. | 713/324 |
| 2011/0239010 A1* | 9/2011 | Jain et al. | 713/310 |

* cited by examiner

*Primary Examiner* — Thomas Lee
*Assistant Examiner* — Aurel Prifti
(74) *Attorney, Agent, or Firm* — Krishnendu Gupta; Joseph D'Angelo

(57) ABSTRACT

A system and method for monitoring power usage in a data storage environment, the system comprising a data storage system, a power monitor coupled to the data storage system and configured to monitor power consumption of the data storage system, a database in communication with the power monitor in order to communicate the monitored power consumption to the database, and computer-executable program code operating in memory coupled with a processor in communication with the database, wherein the computer-executable program code is configured to enable a processor to execute logic to receive power consumption information about the monitored power consumption, and display the monitored power consumption information to a user.

20 Claims, 20 Drawing Sheets

|  | POWER MODULE 1 | POWER MODULE 2 | POWER MODULE 3 | POWER MODULE 4 |
|---|---|---|---|---|
| DATA STORAGE 1 |  |  |  | X |
| DATA STORAGE 2 | X |  |  |  |
| DATA STORAGE 3 |  | X |  |  |
| DATA STORAGE 4 |  |  | X |  |

FIG. 8

| | SERVICES | CLOUD | DATA CENTER | STORAGE | NETWORK | VIRTUAL MACHINE | SERVER | VIRTUAL APPLICATION | ... |
|---|---|---|---|---|---|---|---|---|---|
| PERFORMANCE | X | X | X | X | X | X | X | X | |
| CAPACITY | X | X | X | X | X | X | X | X | |
| POWER | X | X | X | X | X | X | X | X | |
| TEMPERATURE | X | X | X | X | X | X | X | X | |
| CARBON CREDITS | X | X | X | X | X | X | X | X | |
| HUMIDITY | X | X | X | X | X | X | X | X | |
| ... | | | | | | | | | |

FIG. 14

DATA CENTER ENERGY MANAGER FOR MONITORING POWER USAGE IN A DATA STORAGE ENVIRONMENT HAVING A POWER MONITOR AND A MONITOR MODULE FOR CORRELATING ASSOCIATIVE INFORMATION ASSOCIATED WITH POWER CONSUMPTION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to energy management in data storage systems.

BACKGROUND

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used. In a common implementation, a Storage Area Network (SAN) is used to connect computing devices with a large number of storage devices. Management and modeling programs may be used to manage these complex computing environments.

Often cloud computer may be performed with a data storage system. As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation", a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

SUMMARY

A system and method for monitoring power usage in a data storage environment, the system comprising a data storage system, a power monitor coupled to the data storage system and configured to monitor power consumption of the data storage system, a database in communication with the power monitor in order to communicate the monitored power consumption to the database, and computer-executable program code operating in memory coupled with a processor in communication with the database, wherein the computer-executable program code is configured to enable a processor to execute logic to receive power consumption information about the monitored power consumption, and display the monitored power consumption information to a user.

BRIEF DESCRIPTION OF THE DRAWINGS

Features and advantages of the present disclosure will become more apparent from the following detailed description of exemplary embodiments thereof taken in conjunction with the accompanying drawings in which:

The embodiment of FIG. 1 illustrates a simplified data storage environment;

Figure 2:
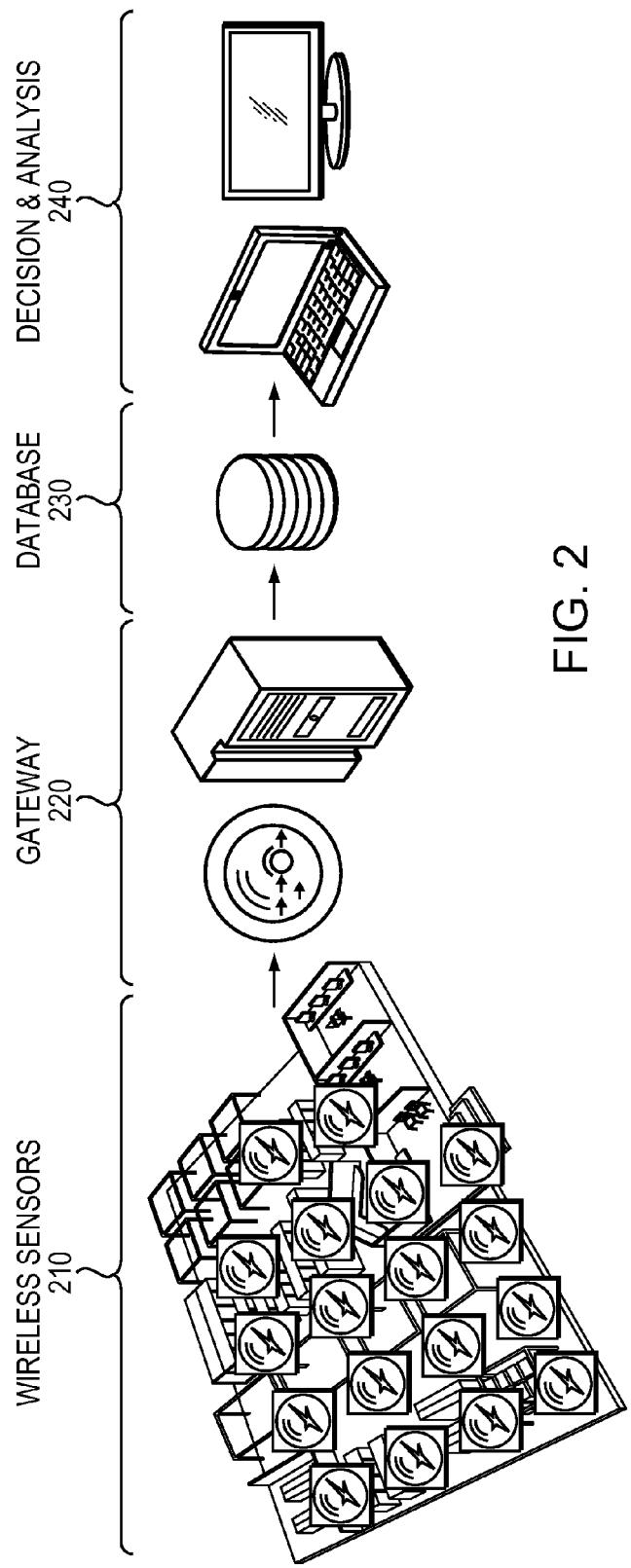
Figure 3:
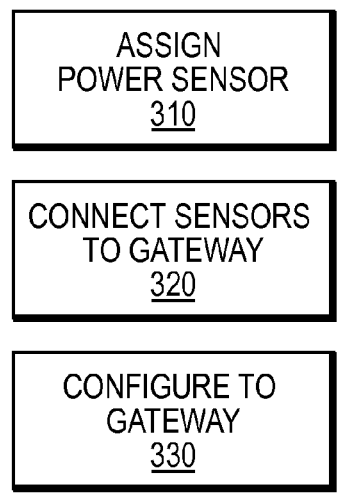
Figure 4:
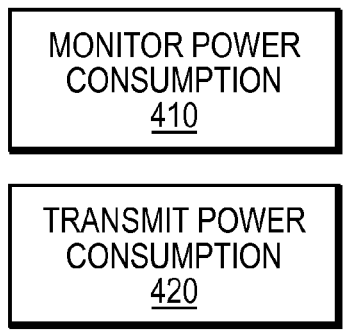
Figure 5:
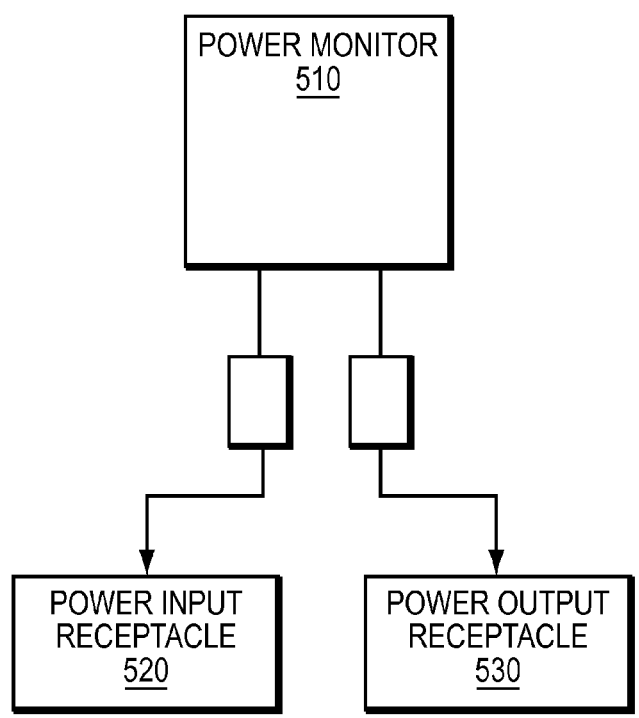
Figure 6:
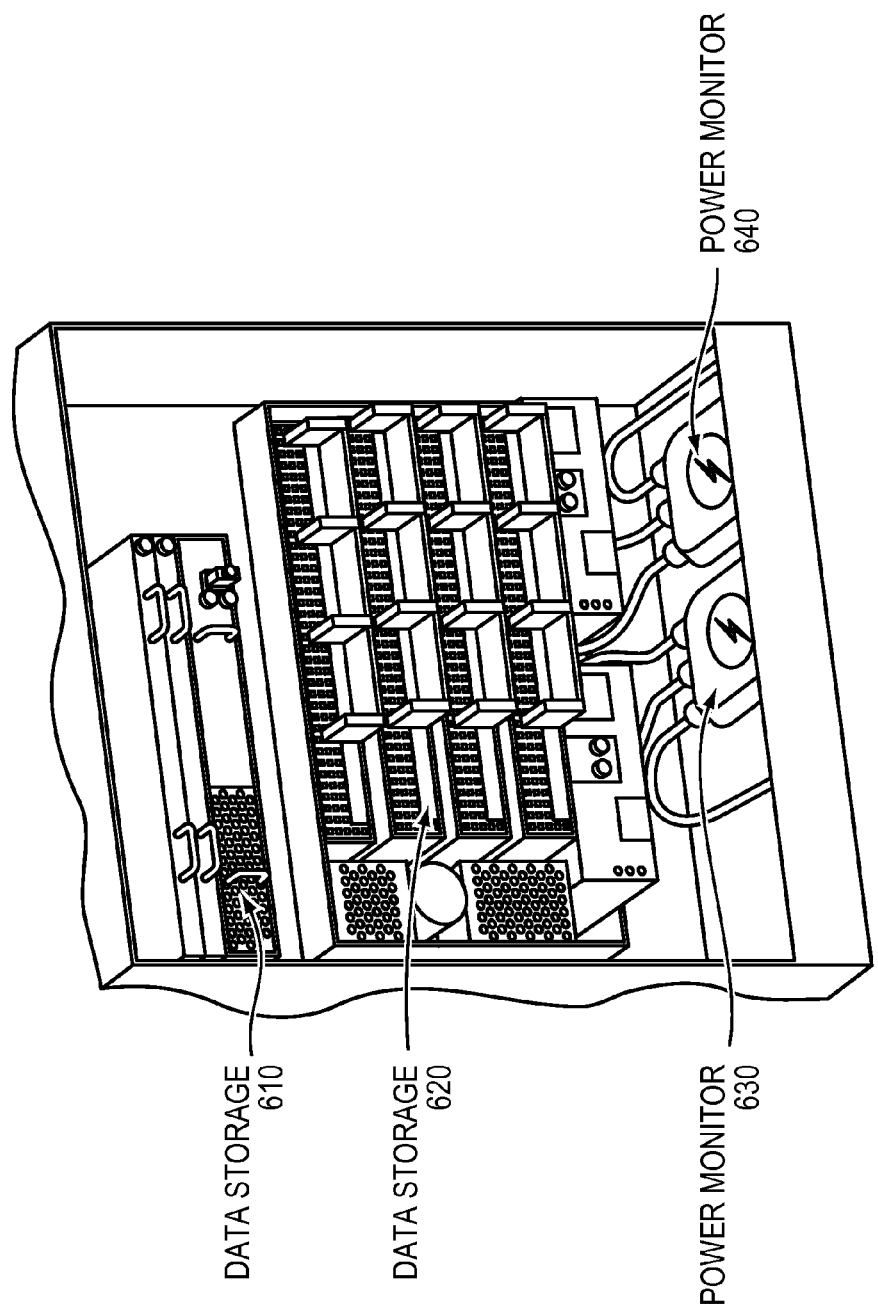
Figure 7:
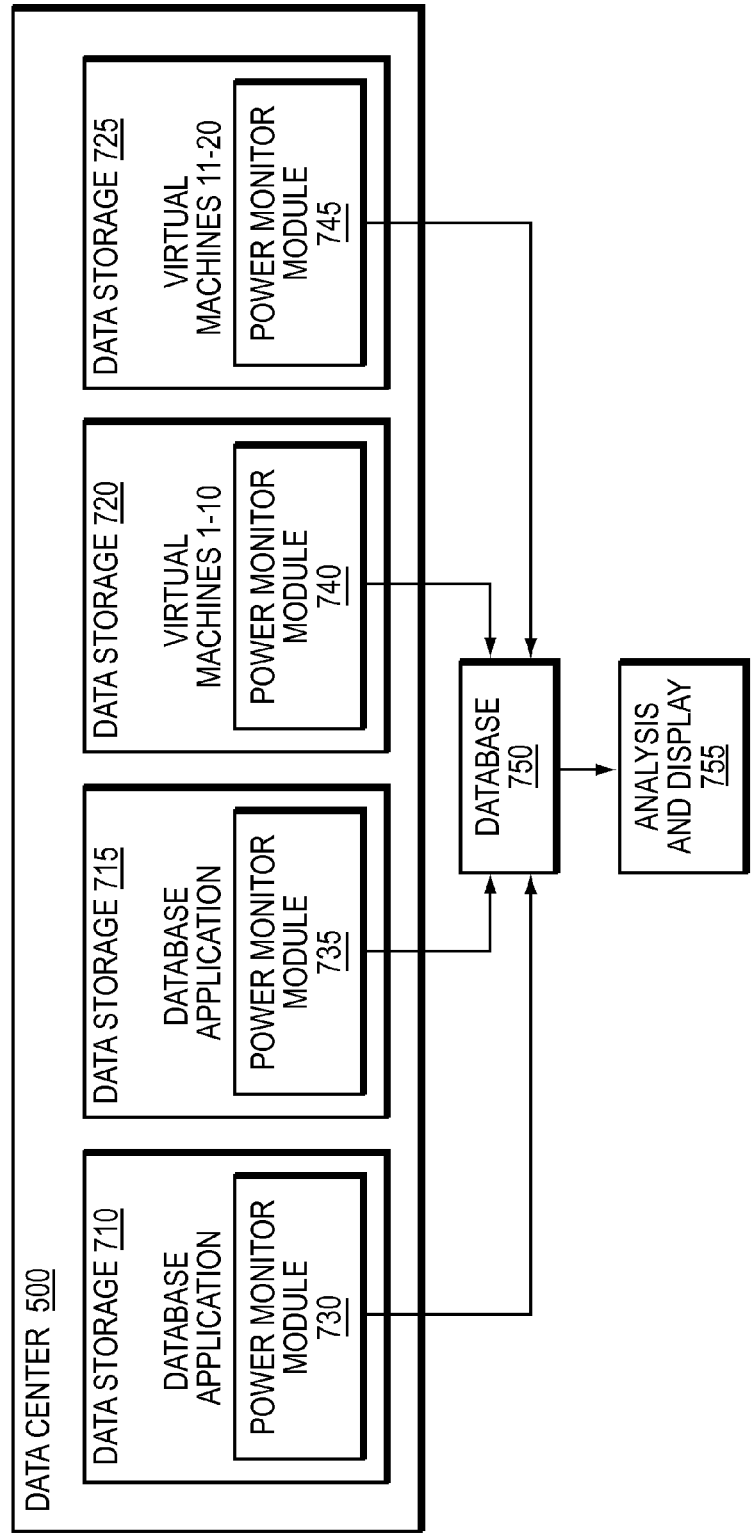
Figure 9:
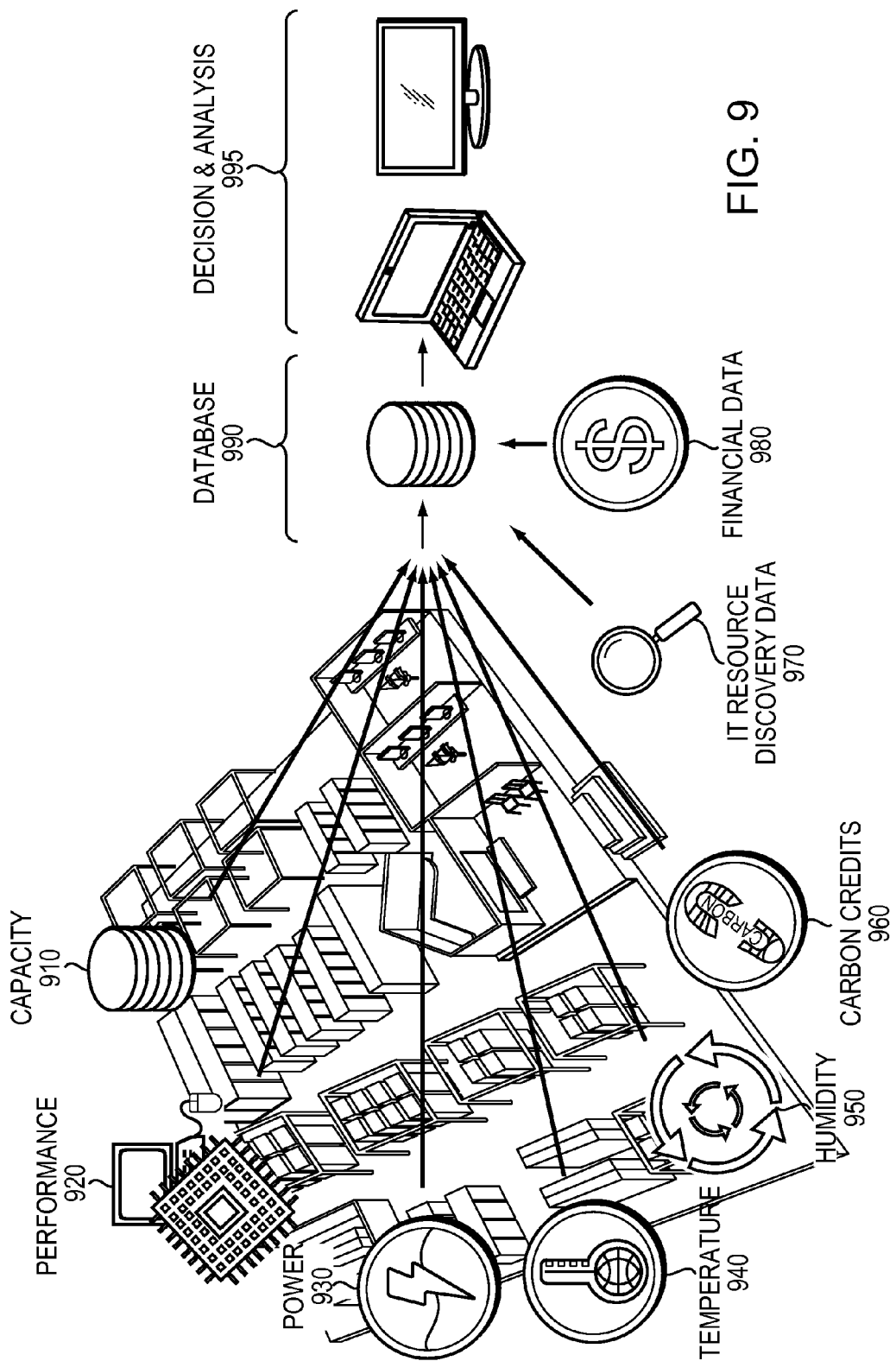
Figure 10:
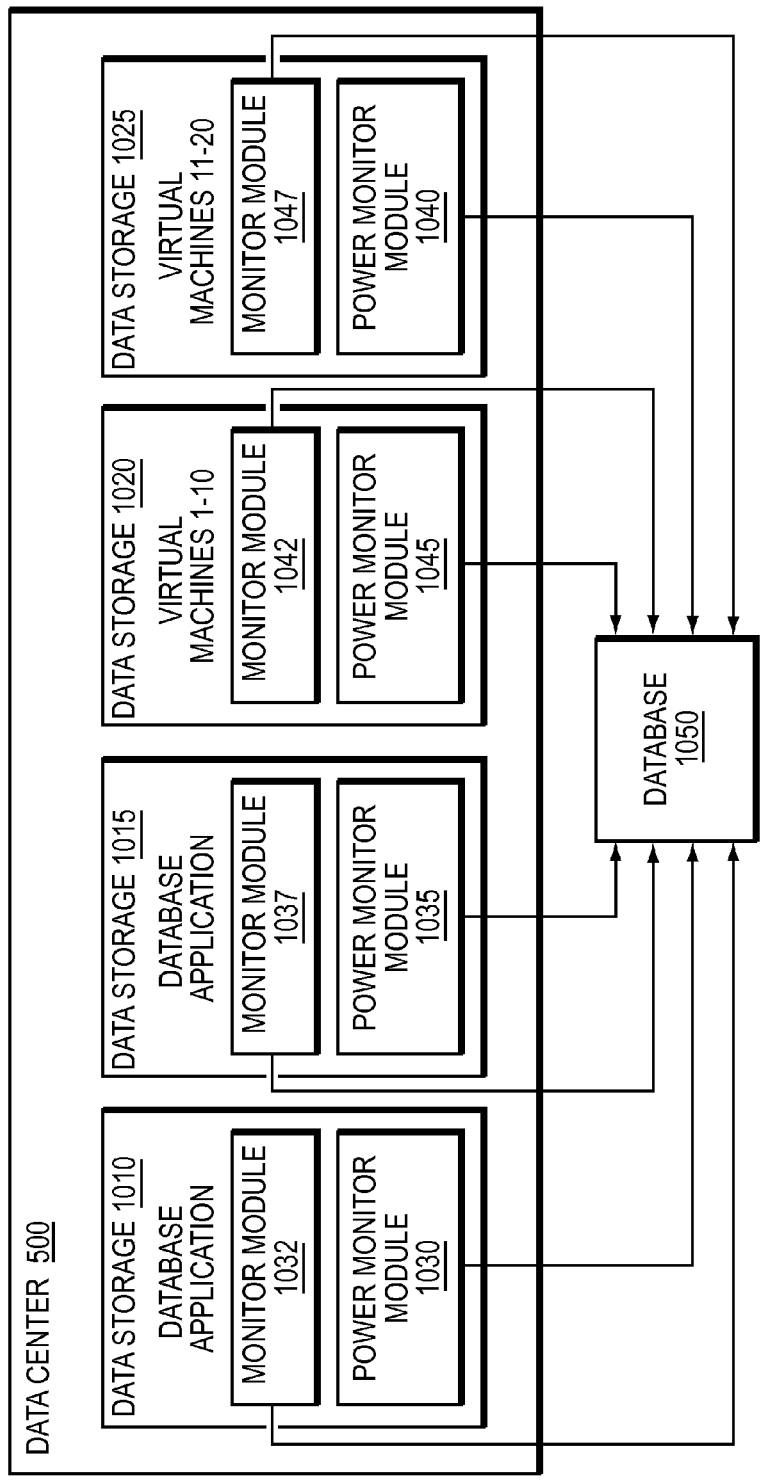
Figure 11:
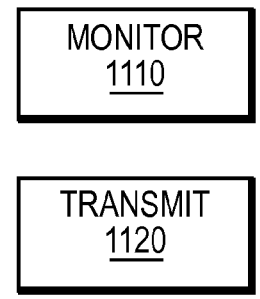
Figure 12:
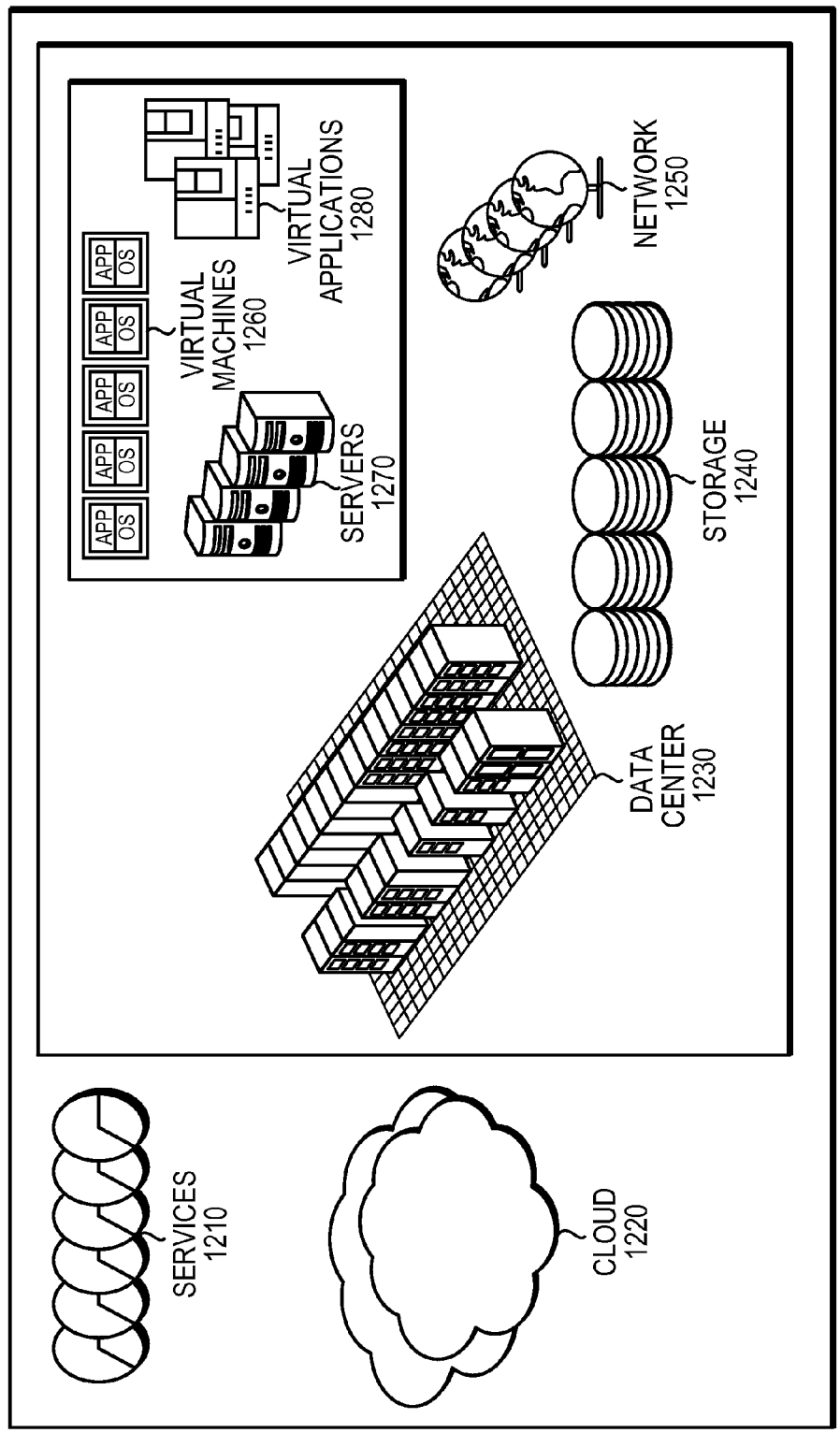
Figure 13:
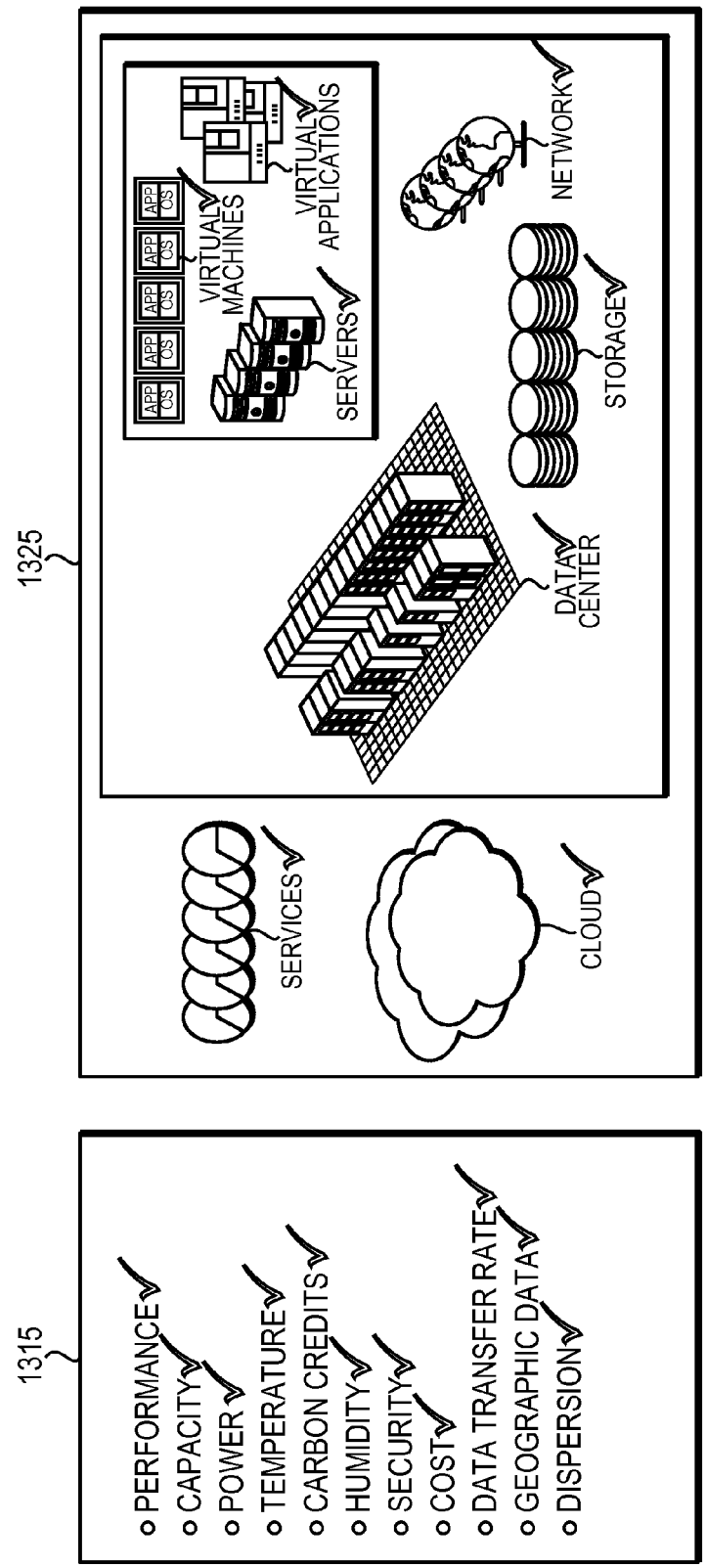
Figure 15:
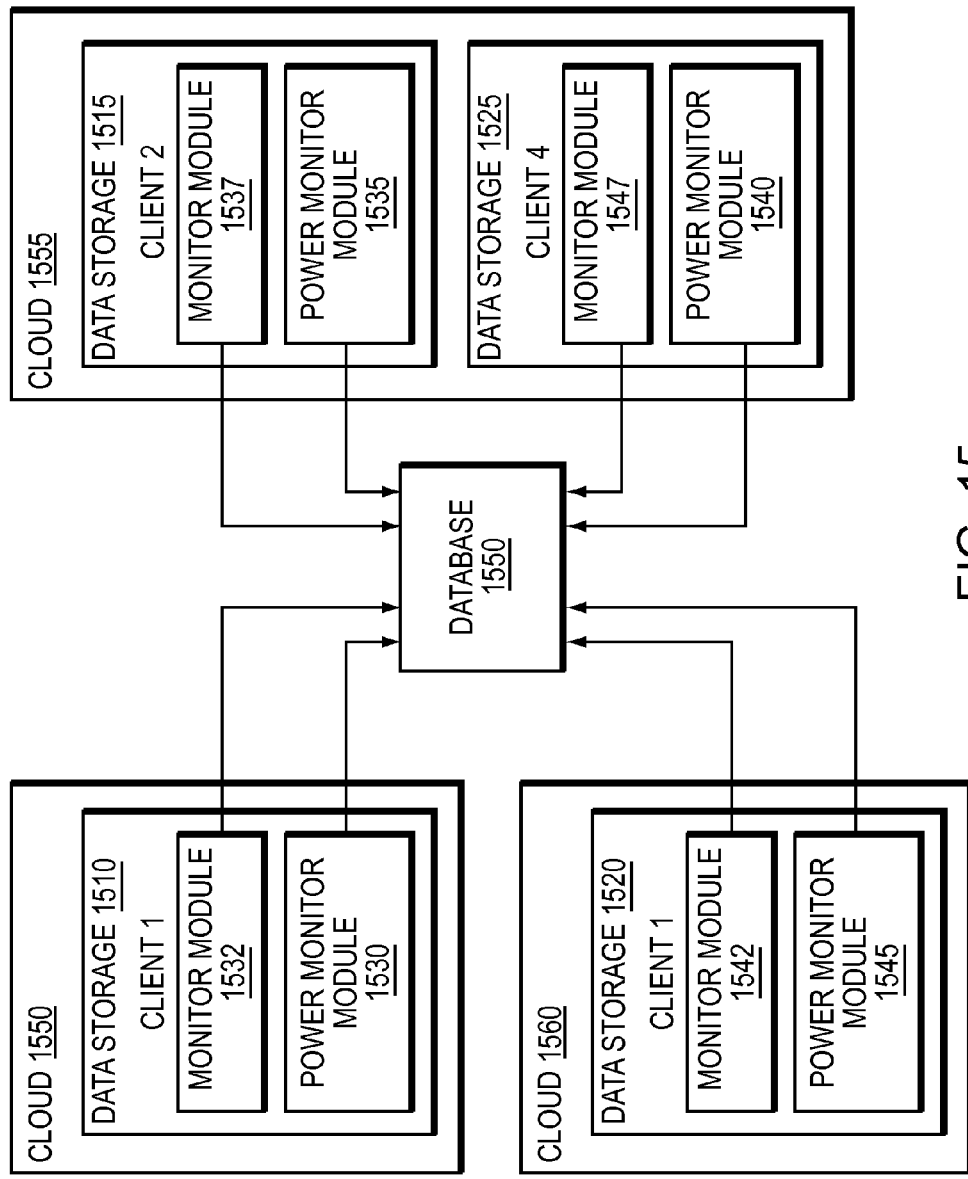
Figure 16:
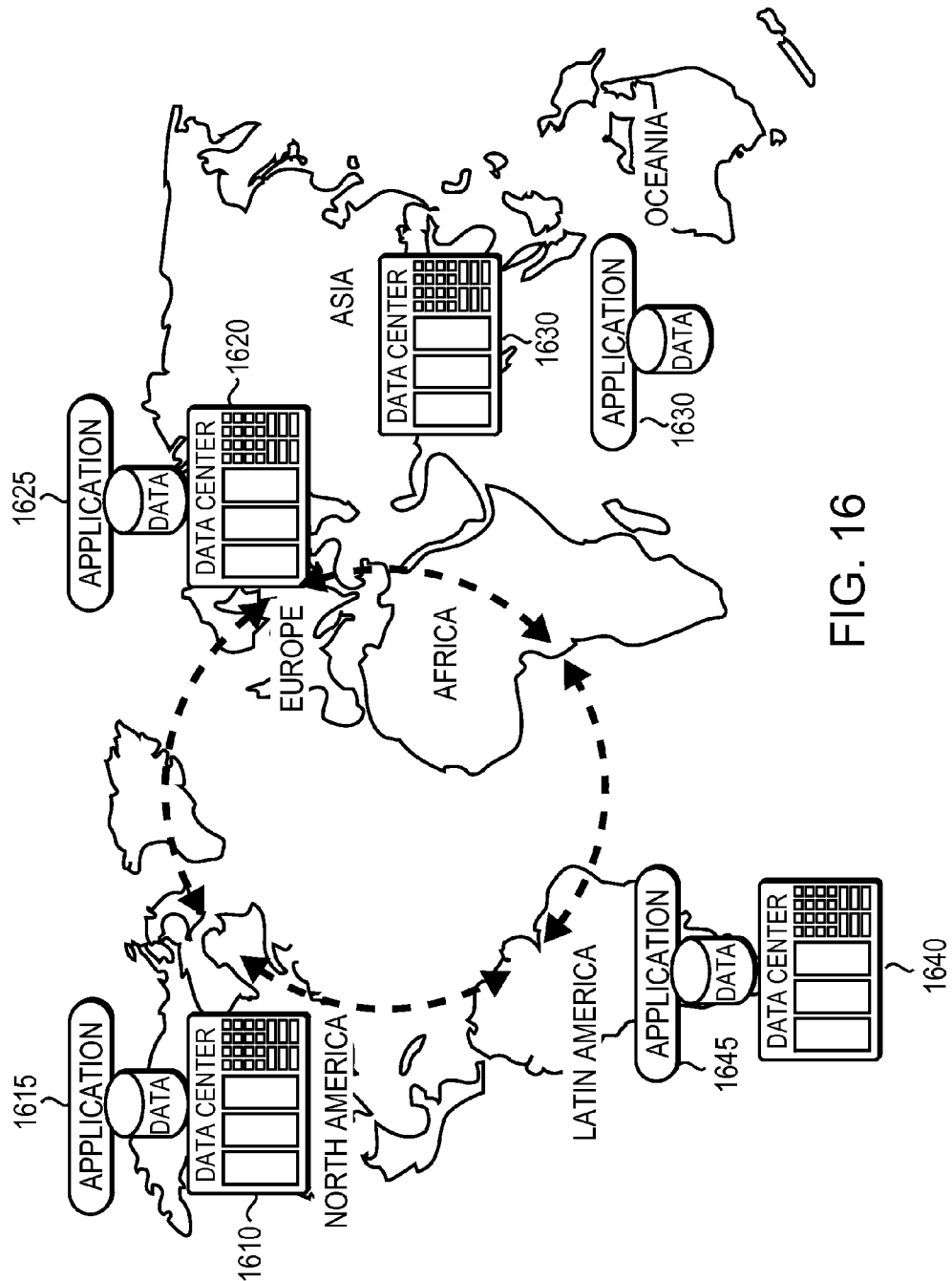
Figure 17:
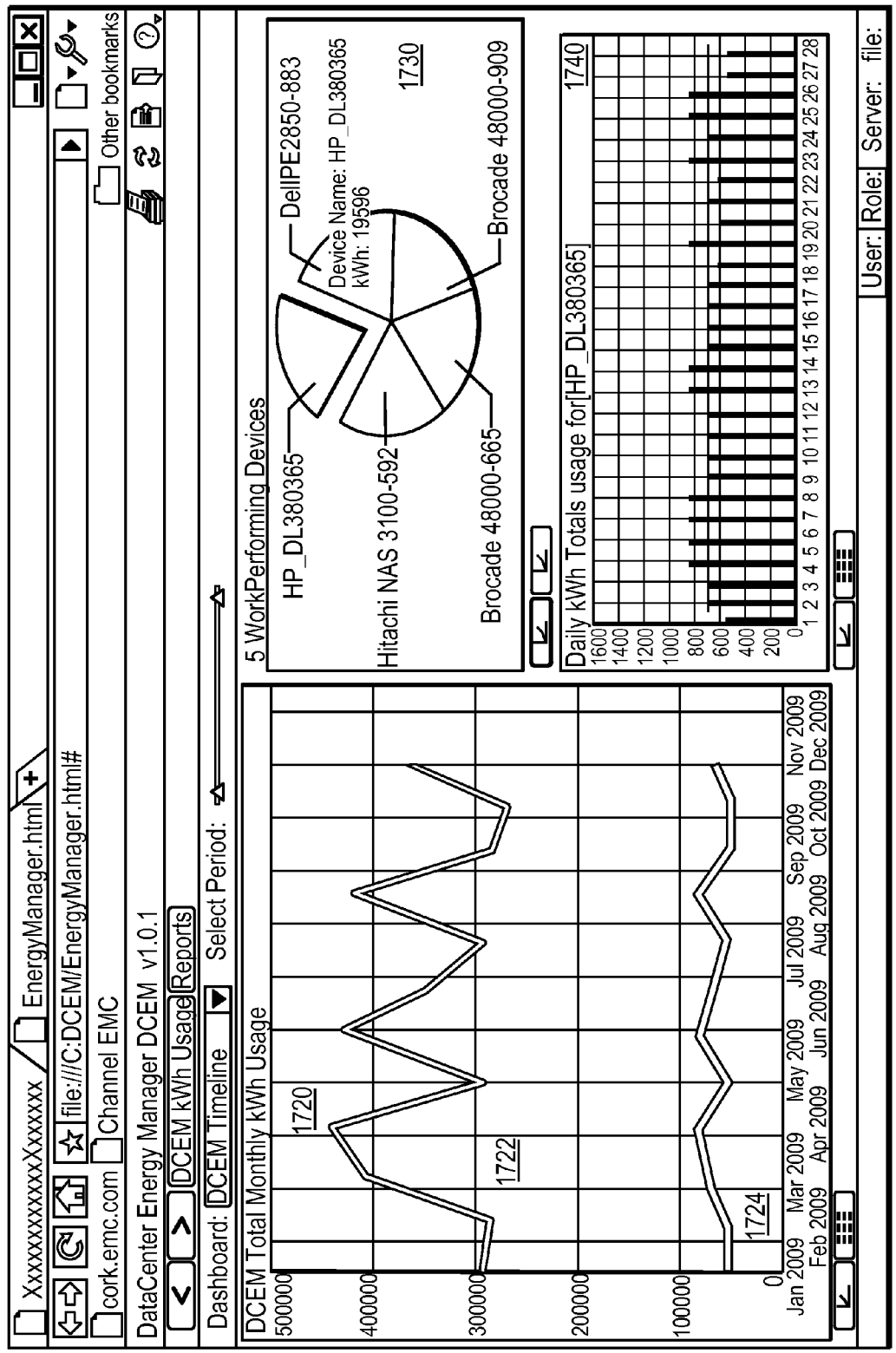
Figure 18:
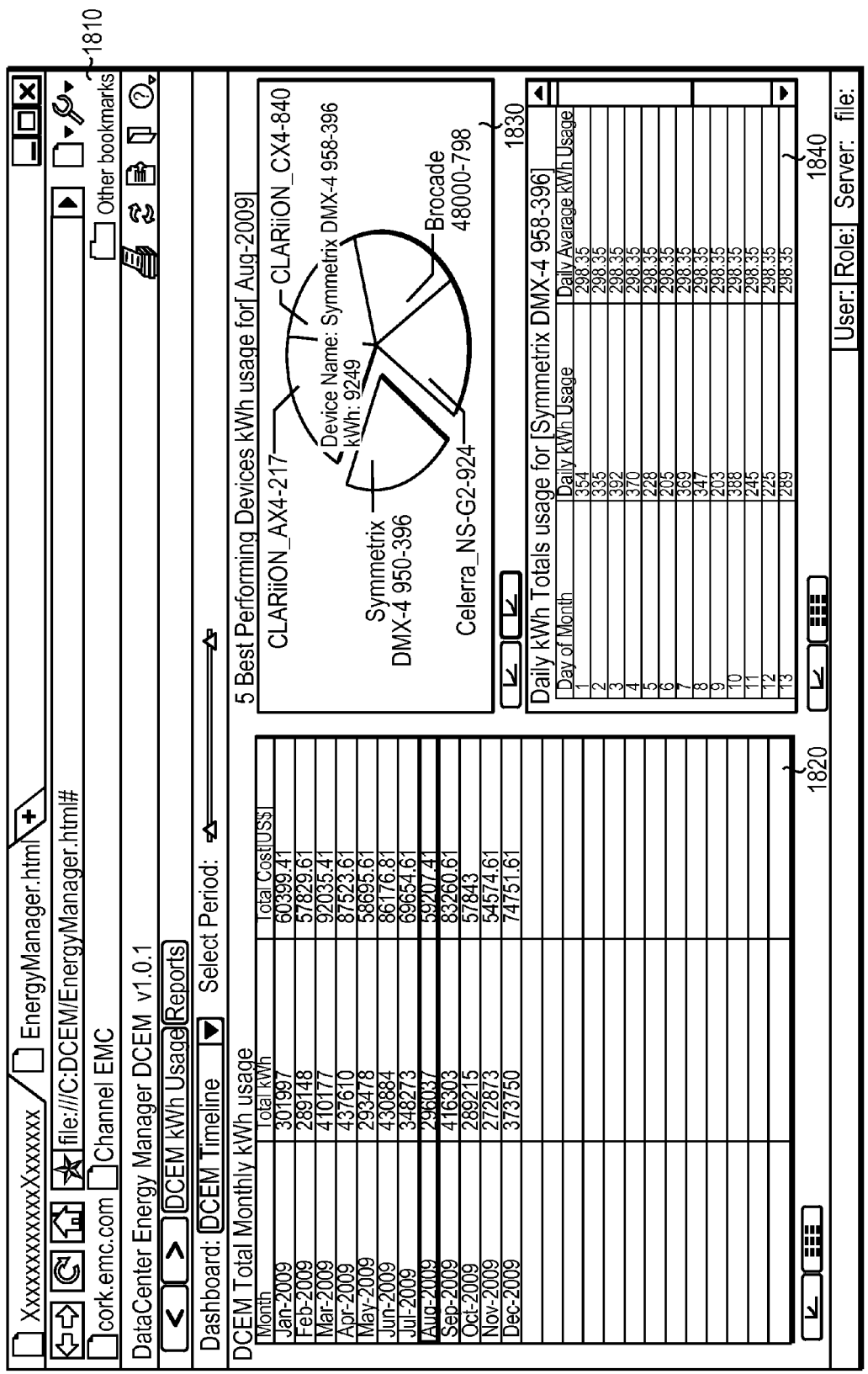
Figure 19:
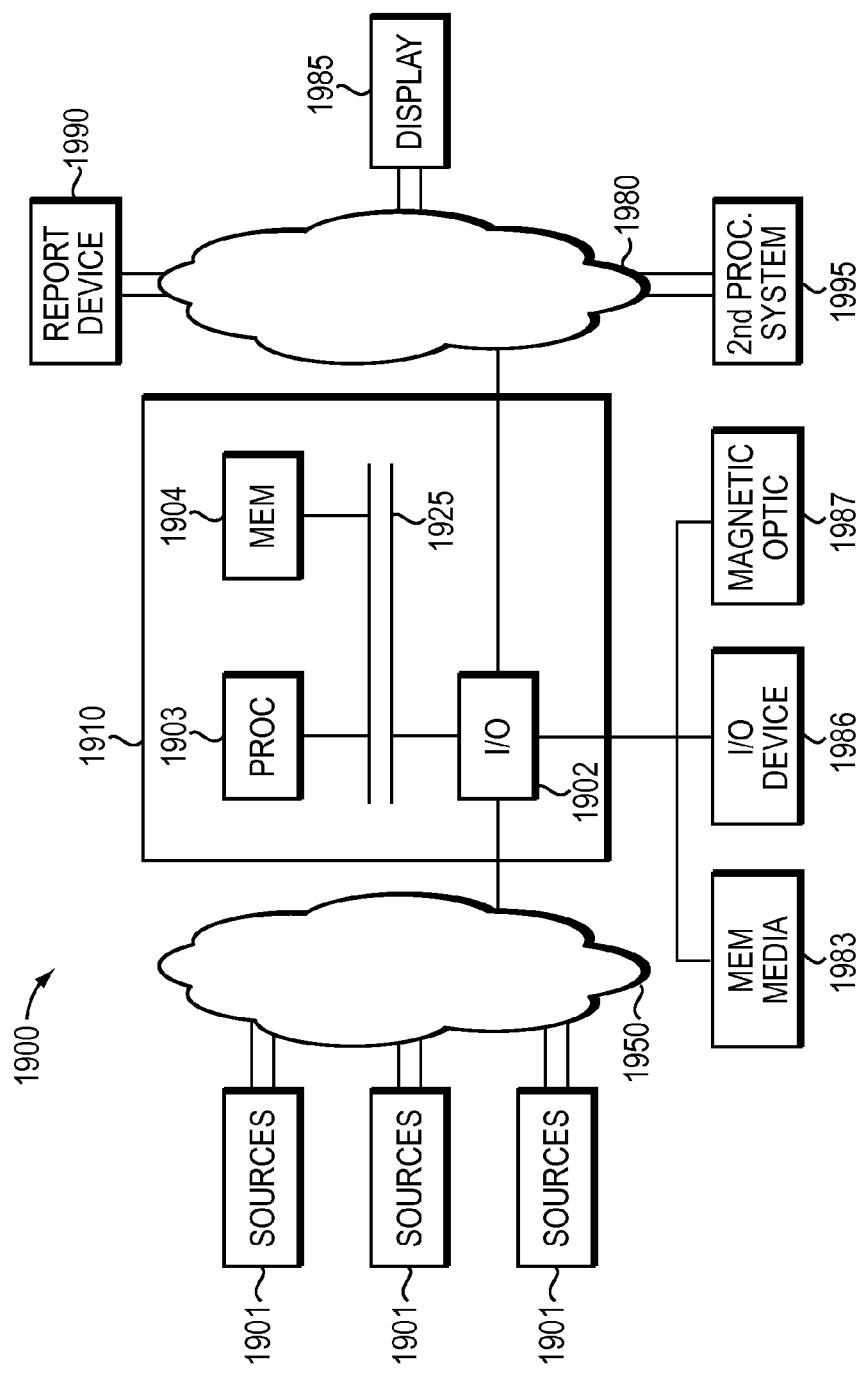
Figure 20:
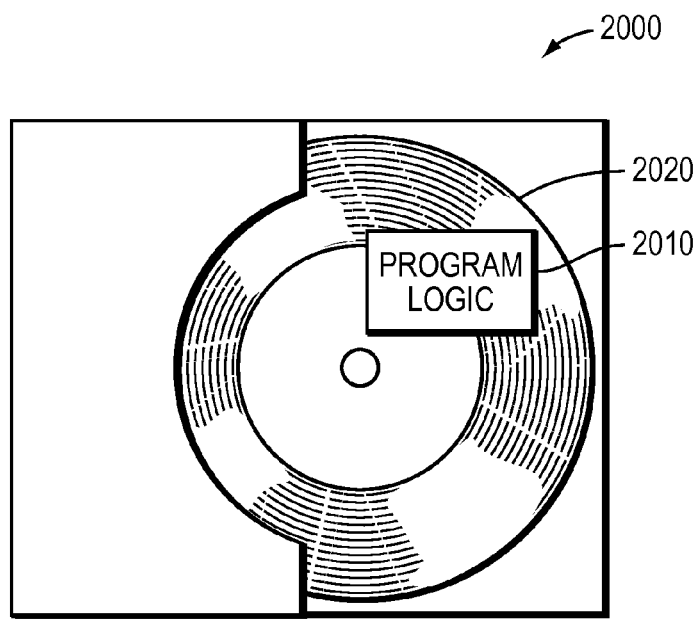

The embodiment of FIG. 2 illustrates a simplified example of a system according to an aspect of the current disclosure;

The embodiment of FIG. 3 illustrates a method of the current disclosure;

The embodiment of FIG. 4 illustrates an alternative method of the current disclosure;

The embodiment of FIG. 5 illustrates a simplified example of an embodiment of an apparatus according to an aspect of the current disclosure;

The embodiment of FIG. 6 illustrates a simplified example of a power monitor and a data storage system according to an aspect of the current disclosure;

The embodiment of FIG. 7 illustrates a simplified example of power monitors and data storage systems according to an aspect of the current disclosure;

The embodiment of FIG. 8 illustrates a simplified grid linking power monitors to data storage systems according to an aspect of the current disclosure;

The embodiment of FIG. 9 illustrates simplified resource metrics that may be monitored in the database according to an aspect of the current disclosure;

The embodiment of FIG. 10 illustrates a simplified example of power monitors, monitor modules, and data storage systems according to an aspect of the current disclosure;

The embodiment of FIG. 11 illustrates an alternative method of the current disclosure;

The embodiment of FIG. 12 illustrates simplified resource containments according to an aspect of the current disclosure;

The embodiment of FIG. 13 illustrates simplified resource containments and simplified resource metrics according to an aspect of the current disclosure;

The embodiment of FIG. 14 illustrates a simplified matrix mapping resource containments to resource metrics according to an aspect of the current disclosure;

The embodiment of FIG. 15 illustrates a simplified example of power monitors, monitor modules, and data storage systems and cloud computing according to an aspect of the current disclosure;

The embodiment of FIG. 16 illustrates a simplified example of geographically disperse data centers according to an aspect of the current disclosure;

The embodiment of FIG. 17 illustrates a simplified example a display of power consumption information according to an aspect of the current disclosure;

The embodiment of FIG. 18 illustrates a simplified example an alternative display of power consumption information according to an aspect of the current disclosure;

FIG. 19 is an example of an embodiment of an apparatus that may utilize the techniques described herein; and FIG. 20 is an example of an embodiment of a method embodied on a computer readable storage medium that may utilize the techniques described herein.

DETAILED DESCRIPTION

Conventionally, the information available to monitor power consumption in data centers has been very limited. Traditionally, resource growth may be tracked using capacity and performance. Generally, power consumption is measured at the transformer level, which may provide power for many data storage systems. Typically, this does not provide granular information to enabling managing of power consumption in a data center.

As well, typical data may be stored in either a virtual or non-virtual data center. However, typically there may be little to no power monitoring tools available in a virtual data center. Further, as conventional data storage systems become more virtual and mobile, it may be even more difficult to trace resource usage. Generally, not all efficiency metrics may be measured at the level of granularity typically required for service level management to ensure a service level agreement (SLA).

Thus, the efficiency of IT resources are traditionally measured on capacity utilization and resource performance, i.e. storage device performance. However, IT managers may now be required to include sustainability as an efficiency factor. Yet, there is not a conventional way to measure sustainability metrics at the level of granularity required to combine traditional efficiency measurements and sustainability. Therefore, additional information which would provide the ability to minimize power consumption in a data center or to shift data processing to an environment where power consumption costs less may be advantageous.

As well, today's IT managers usually have no way to charge for carbon credits or power consumed for their service offerings. As IT computing models move to service and cloud based, it may become important to measure and apply chargeback costs for those services. As cloud services be multi-tenant, it may be important to measure usage to the virtual application level and correlate what resources applications consume across the data center.

In an embodiment of the current disclosure, resource growth and usage may be tracked by sustainability. In some embodiments, the current disclosure may enable an analysis of at what point will a resource consume too much power given current power consumption growth. In another embodiment, the current disclosure may enable analysis to determine when a resource hit a temperature ceiling limit. In further embodiments of the current disclosure, IT resource discovery, I/O metrics and power measurements may be combined to determine power usage at the virtual layer.

An embodiment of the current disclosures enables monitoring of power consumption in a data center at granular level. In some embodiments of the current disclosure, power consumption of a data center may be monitored at the data storage device level. In other embodiments, power usage may be measured at an application level within a storage device. In further embodiments, power usage may be measured at the virtual machine level. In still other embodiments, power usage may be measured at the application level within a virtual machine. In alternative embodiments, power usage may be grouped by application type, storage device type, and location.

In some embodiments, power usage may be expressed as the cost to use the power. In certain embodiments, the power usage information may be calculated in different ways such as per machine, per application, and per virtual machine. In further embodiments, power usage may be measured by who is using the power such as a particular user or company. In at least some embodiments, the usage data processing may be measured per cloud using the data center power. In certain embodiments, the power usage of the cloud may be calculated although the cloud may be using resources of several different data centers. In further embodiments, data storage usage may be measured in relation to processor performance, capacity, power consumption, temperature of the stat storage, humidity, and carbon credits.

In an embodiment of the current disclosure, a power monitor may be deployed to each device in a data center. In certain embodiments, the power monitor may measure the power consumed by that device. In some embodiments, the power monitor may transmit the power usage information to a central repository, such as a database. In a particular embodiment, the power usage may be transmitted from the power monitors to a gateway. In further embodiments, the gateway may transmit the power information to a database. In some embodiments the power information may be transmitted wirelessly and in other embodiments it may be transmitted through a wired connection. In alternative embodiments, the database may have information linking the power monitor to what data storage device the power monitor is assigned. In further embodiments, the database may cross references the power information with information about data storage capacity, performance, temperature, humidity and carbon credits. In further embodiments, the database may have access to a database at another data center to enable calculation of resource consumption for a cloud or request using resources at more than one data center.

In at least some embodiments, each data storage device may have a monitor. In certain embodiments the monitor may measure the I/O of that device referenced to different operations. In some embodiments, the monitor may measure I/O per application. In other embodiments, the monitor may measure I/O per virtual machine (VM). In further embodiments, the monitor may measure I/O per application within a VM. In alternative embodiments, the monitor may transmit the information to the database. In other embodiments, the monitor may measure the internal temperature of the machine or the CPU cycles per VM or VM Application. The information collected by the monitor may be transmitted to the database. The database may have information to cross reference the information transmitted by the monitor to the power consumption information. In at least some embodiments the monitor may transmit the information across the network.

In certain embodiments, the information in the database may be accessed by an analysis module and by a display module. In some embodiments, the analysis module may enable analysis of the data. In other embodiments, the display module may enable display of the information transmitted to the database. In some embodiments of the current disclosure, the data base may collect information about some or all of the following: cost, security, carbon credits, performance, capacity, availability, time, geo dispersal, power consumed, utilization, input/output data transfer rate, Kilowatt pricing, data centre cooling management, humidity, temperature. In further embodiments, the database may have access to information from other data storage environment databases. In further embodiments, additional sensors may provide information to the database.

In other embodiments, the database may enable management decisions to ensure service level objectives around cost, security, carbon credits, performance, capacity, availability, time, geo dispersal, power consumed, utilization, input/output data transfer rate, Kilowatt pricing, data centre cooling management, humidity, temperature. In some embodiments, the availability of the information may enable a user to make intelligent choices about distributing resources and applications between data center environments. In other embodiments, pieces of a cloud or virtual data center may be moved between geographically disperse data centers to leverage carbon credits or power costs.

Figure 1:
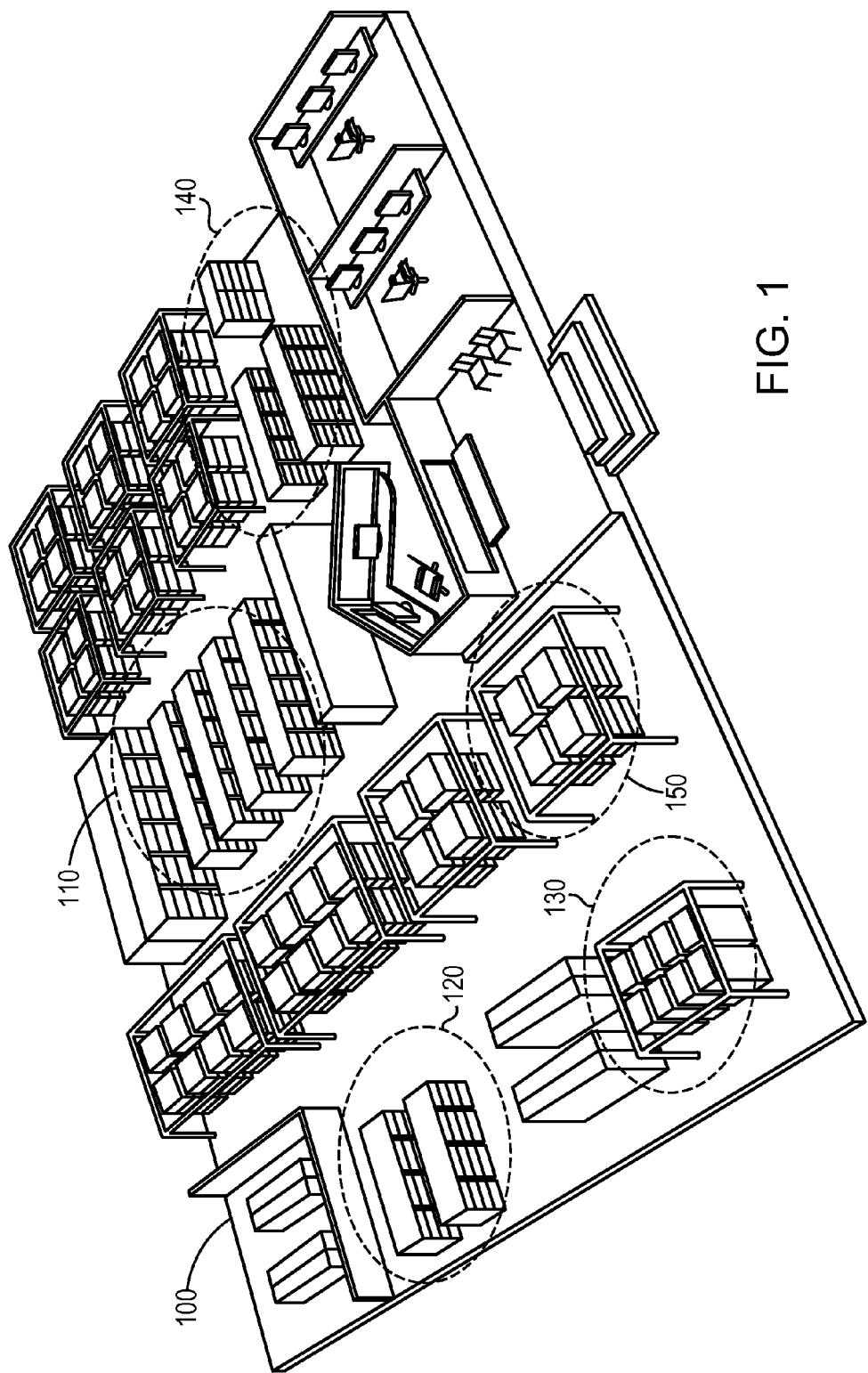

Refer now to the embodiment of FIG. 1. FIG. 1 represents a simplified embodiment of a Data Center 100. Data center 100 has zones 110, 120, 130, 140, and 150. Each zone of Data Center 100 may represent a grouping of storage components. As well, each zone of Data Center 100 may represent a different type of data storage or processing. For example, zone 110 may represent data processing for virtual machines while zone 150 may represent a where database applications are run. Each zone within Data Center 100 may consume different amounts of power and each data storage component within each zone may consume different amounts of power.

Refer now to the embodiments of FIGS. 2, 3, and 4. FIG. 2 represents a simplified embodiment of an aspect of the disclosure. FIG. 2 has wireless sensors 210. Each of the wireless sensors in 210 is assigned to a data storage component (step 310). Each of the sensors 210 is commutatively coupled to the gateway 220 (step 320). In some embodiments, the coupling may be wired and in other embodiments it may be wireless. Each sensor of the wireless sensors 210 monitors the power of the respective data storage components (step 410). As well, each sensor of the wireless sensors 210 is capable of transmitting the information regarding power usage to gateway 220 (step 420). Gateway 220 is configured to communicate with database 230 (step 330). Gateway 220 may transmit the power information to the software 240.

Refer now to the embodiment of FIG. 5. The embodiment of FIG. 5 illustrates a sample power monitor 510. Power monitor 510 has an input power receptacle 520 and an output receptacle 530. Power monitor 510 may be placed between a power input and a power output for a data storage system. Power monitor 510 may also transmit the power consumption information wirelessly to a gateway. In other embodiments, power monitor may use other ways to determine the power drawn by a storage component.

Refer now to the embodiment of FIG. 6. The embodiment of FIG. 6 illustrates data storage 610 and data storage 620 connected to power monitors 630 and 640 respectively. Monitor 610 monitors the power consumption of data storage 610 and monitor 640 monitors the power consumption of data storage 620. Monitors 630 and 640 may transmit the power consumption information wirelessly.

Refer now to the embodiment of FIGS. 4 and 7. FIG. 7 illustrates a simplified data center according to an aspect of the disclosure. Data center 700 has 5 data storage components 710, 715, 720, and 725. Each data storage component has a power monitor, such as power monitor 730, and is used for a particular purpose. For example, data storage 710 may be used for database applications and data storage 725 may run virtual machines. Power monitors 730, 735, 740, and 745 may monitor the consumption of data storage components 710, 715, 720, and 725 (step 410). Power monitors 730, 735, 740, and 745 may transmit power information to database 750 (step 420). The power monitors may be used to calculate power usage per data storage for a given data center. Refer now to the embodiment of FIG. 8. FIG. 8 illustrates a simplified mapping of which power module records power consumption for which data storage.

Refer now to the embodiment of FIG. 9. In this embodiment, capacity 910, performance 920, power 930, temperature 940, humidity 950, and carbon consumption or carbon credits may be also be monitored and sent to the database 990 to be referenced with power consumption. Decision and Analysis 995 may reference the database to provide granular information for each of these metrics.

Refer now to the embodiments of FIGS. 4, 10, and 11. FIG. 11 represents a data center 1000, where each data storage unit, such as data storage unit 1010, has a monitor module such as monitor module 1032. The monitor module 1032 may monitor the operations occurring in the data storage unit 1010. For example, monitor module 1032 may monitor the database applications running in data storage 1010. Monitor 1032 may record the I/O per database request. Monitor 1032 may monitor the CPU cycles per database application or per database request. Monitor module may be configured to monitor any operation occurring on the data storage (step 1110). Monitor module may also transmit the information to database 1050

(Step 1120). In some embodiments, the monitor module may be embodied as a software program resident on the data storage unit. In other embodiments, the monitor module may be embodied as a piece of hardware integrated into the data storage system.

As well, the power monitor module, such as power monitor module 1030 or monitor module, such as monitor module 1032, may provide further information such as the temperature and or humidity of or produced by data storage unit. In some embodiments, this information may also be used to calculate the carbon consumption and hence carbon credits for the data storage environment. In alternative embodiments, additional sensor data from additional sensors, such as the overall temperature of the data storage environment and the humidity of the data storage environment may be integrated with the sensor data of the monitor module and the power monitor module.

In further embodiments, the information received from the monitor modules may be cross referenced with the information received from the power monitor module. In some embodiments, the cross reference may be in a grid, such as the grid of FIG. 8. The information may be cross referenced between the monitor module and the power modules to may make it possible to monitor, calculate, and perform analytics on information such as power usage per application, power usage per I/O, power usage per I/O per application, power usage per Virtual Machine for a particular data center, performance of a data storage unit, temperature of a data storage unit, temperature of the data storage environment, cooling cost of the data storage environment, humidity of the data storage environment, the carbon production of the data storage environment, and the carbon credits for a data storage environment.

Refer now to the embodiment of FIG. 12. The embodiment of FIG. 12 illustrates some of the resource containments for which it would be useful to measure the metrics outlined in FIG. 9. For example, FIG. 12 illustrates a concept of a data cloud 1220, or computing resources aggregated into a computing cloud. The computing cloud may have resources spread across multiple data centers. In some embodiments, it may be useful to measure the consumption of resources for a cloud. FIG. 12 also illustrates a set of services 1210. In certain embodiments, it may be useful to know how much power is being consumed by a service or the cooling cost required to provide sufficient cooling for a set of service. Another data resource containment construct may be that of a data center 1230. It may be helpful to understand the cooling costs, the power costs, the processor utilization of a data center itself, as well as a data center referenced against a cloud or a set of services (i.e. what portion of the aforementioned data center may be referenced to a particular cloud or set of services). As well, it may be beneficial to correlate the aforementioned metrics per server 1270 or per virtual machine 1260, or even per virtual application 1280 running on the virtual machines 1260.

Refer now to the embodiment of FIG. 13. FIG. 13 shows chart 1315 referring to example measurable metrics, such as performance capacity, power, temperature, carbon credits, humidity, security, cost, data transfer rate, geographic data, and dispersion, from the embodiment of FIG. 9 with the example resource containments 1325 of FIG. 13. The embodiment of FIG. 14 illustrates a matrix of sample measurable resources against some sample resource containments.

Refer now to the embodiment of FIG. 15. The embodiment of FIG. 15 illustrates a simplified representation of three clouds 1550, 1560, and 1515 (i.e. resource containment) and the data storage used by each cloud. For example, Cloud 1555 uses data storage 1115 and 1125. While data storage 1515 and 1525 are used by cloud 1555, the data storage for cloud 1555 could be located in geographically disparate locations. Each monitor module, such as modules 1532, 1537, 1542, and 1547 transmit information to database 1550. As well, power monitors, such as 1530, 1535, 1540, and 1545 transmit power consumption information to database 1550. Database 1550 may contain a correlation of the clouds for a variety of measurement metrics.

Each location may have a different cost for power usage. Thus, the power usage per I/O that cloud 1555 uses may be a combination of two different costs per I/O. The cost of the power where data storage 1515 is located and the cost of the power where data storage 1525 is located. This information may be recorded and cross referenced in database 1550. This information may be used to calculate the cost, per cloud, of power usage. This information may also be used to calculate the I/O cost for the cloud. In some embodiments, each this information may not be transmitted to a central database but may be accessible by combining the information in the databases of several data storage environments' databases.

Refer now to the embodiment of FIG. 16. FIG. 16 illustrates four data centers, 1610, 1620, 1630, and 1640 located in 4 different geographic locations. FIG. 16 also illustrates that an application or a VM, such as application 1625, may be transferred between data centers. In the embodiment of FIG. 16, a decision may be made to transfer a VM from one data center to another based on power consumption. In another embodiment, a decision may be made to transfer information In some embodiments, given measurement and correlation all of efficiency metrics, an informed decision may be made about where to best locate applications and services. In certain embodiments, this may mean running an air cooled data centre in North America during the winter, and dynamically moving the services to a cooler location during the summer. In further embodiments, it may mean having a geographic follow the moon approach, moving services to run at night time, when lower power consumption tariffs apply. In further embodiments it may enable users to automatically move services when a carbon credit threshold is reached.

In at least some embodiments, geo-dispersal of information may not be a requirement. In certain embodiments, ensuring individual data centers are run at maximum efficiency may a requirement. In further embodiments, today capacity and performance factors may be used to dynamically balance workloads. In some embodiments, load balancing for power and temperature efficiency and to maximize efficiency by combining all metrics in balancing workloads may be performed. In an embodiment, it may make sense to move data based on performance, but that move may result in a higher power consumption cost on another device. In another embodiment, equally a better temperature and power workload distribution may result in degradation of resource performance. In further embodiments, by taking all factors into account, IT managers may be able to fine tune and optimize their data storage environments for maximum efficiency. In some embodiments of the current disclosure, a Service Level Agreement is enabled which contains power cost information or carbon credit requirements.

Refer now to the embodiment of FIG. 17. FIG. 17 represents a sample display 1710 for power usage for a data center. In box 1720 of display 1710, the usage per kilowatt hours is displayed 1722 as well the cost of using those kilowatt hours 1724. Box 1230 illustrates the 5 devices using the most power for a given time period. Box 1740 illustrates a graph of usage for a particular device.

Refer now to the embodiment of FIG. 18. FIG. 18 represents a sample display 1810 for a particular group of machines in a data center. Display 1820 shows the selected machines. Box 1830 shows a pie chart of the devices consuming the most power for the selected displays. Box 1840 illustrates the sample daily power usage and the daily average power usage.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

The methods and apparatus of this disclosure may take the form, at least partially, of program code (i.e., instructions) embodied in tangible or non-transitory media, such as floppy diskettes, CD-ROMs, hard drives, random access or read only-memory, or any other machine-readable storage medium. When the program code is loaded into and executed by a machine, such as the computer of FIG. 19, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 20 shows Program Logic 2020 embodied on a tangible, non-transitory computer-readable medium 2030 as shown, and wherein the Logic is encoded in computer-executable code configured for carrying out the reservation service process of this invention and thereby forming a Computer Program Product 2000.

The logic for carrying out the method may be embodied as part of the aforementioned system, which is useful for carrying out a method described with reference to embodiments shown in, for example, FIG. 2 and FIG. 4. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A system for monitoring power usage in a data storage environment, the system comprising:
   a data storage system;
   a power monitor coupled to the data storage system between a power source for the data storage system and the data storage system and configured to monitor power consumption of the data storage system;
   a database in communication with the power monitor in order to communicate the monitored power consumption to the database; and
   computer-executable program code operating in memory coupled with a processor in communication with the database, wherein the computer-executable program code is configured to enable a processor to execute logic to:
   receive, at the database, power consumption information about the monitored power consumption of the data storage system from a monitor module and the power monitor module;
   wherein the monitor module measures power usage at an application level;
   wherein the application level is enabled to include virtual machines;
   wherein the power monitor measures power usage at the data storage level;
   correlate associative information from the monitor module and the power monitor module of the data storage relating to processor utilization per virtual machine;
   wherein the database is enabled to correlate information received from the power monitor through a wireless connection with associate information received from the monitor module of the data storage system to enable a determination of power usage per Virtual Machine (VM); and
   display the monitored power consumption information to a user.

2. The system of claim 1 wherein the data storage environment is a virtual data storage center.

3. The system of claim 1 wherein the computer-executable program code is further configured to:
   apply analytical calculations on the power consumption data.

4. The system of claim 1
   wherein the data storage system comprises a monitor; and
   wherein the computer-executable program code is further configured to:
   correlate associative information from the monitor of the data storage system to the power consumption data.

5. The system of claim 4 wherein the associative information from the monitor includes a measure of I/O data transfer.

6. The system of claim 4 wherein the associative information from the monitor includes processor power utilization.

7. The system of claim 4 wherein the data storage system comprises virtual machines.

8. The of system of claim 7 wherein database has information about carbon credits; and
   wherein the computer-executable program code is further configured to:
   correlate associative information about the carbon credits to the power usage.

9. The of system of claim 7 wherein database has information about the data storage system cooling; and
   wherein the computer-executable program code is further configured to:
   correlate associative information about the carbon credits to the power usage.

10. A method for monitoring power usage in a data storage environment, the data storage environment containing a data storage system, a power monitor coupled between
   a power source for the data storage system and the data storage system, and a database, the method comprising:
   communicating power consumption of the data storage system from the power monitor coupled between the power source for the data storage system and the data storage system to the database;
   communicating other metrics of the data storage system to the database;
receiving, at the database, power consumption information about the monitored power consumption and other data storage system metrics from a monitor module and the power monitor module;

wherein the monitor module measures power usage at an application level;

wherein the application level is enabled to include virtual machines;

wherein the power monitor measures power usage at the data storage level;

correlating associative information from the monitor module and the power monitor module of the data storage relating to processor utilization per virtual machine;

wherein the database is enabled to correlate information received from the power monitor module through a wireless connection with associate information received from the monitor of the data storage system to enable a determination of power usage per Virtual Machine (VM); and displaying the monitored power consumption information and other metrics to a user.

11. The method of claim 10 wherein the data storage environment is a virtual data storage center.

12. The method of claim 10 further comprising:
apply analytical calculations on the power consumption data.

13. The method of claim 10
wherein the data storage environment further comprises a monitor; and
wherein the method further comprises:
correlate associative information from the monitor of the data storage system to the power consumption data.

14. The method of claim 10 wherein the database enables an analysis including cooling costs and power consumption to determine whether to move a VM from the data storage system to a second data storage system.

15. The method of claim 13 wherein the database contains information to enable correlation between carbon credits and the power usage.

16. The method of claim 10 wherein the database is enabled to access information to enable calculation of power information for a data cloud.

17. The method of claim 10 wherein the database is enabled to access information to enable calculation of power information for a service.

18. The system of claim 7, wherein the power monitor has a wireless link to a gateway to transmit information to the database.

19. The system of claim 18 wherein the data storage environment has a plurality of data storage systems, wherein the data storage system is one of the plurality of the data storage systems; wherein each of other of the plurality of data storage systems has a power monitor coupled to the each data storage system of the plurality of data storage systems between a power source for the each data storage system and the each data storage system and configured to monitor power consumption of the each data storage system.

20. The system of claim 1 wherein the database is enabled to access information to enable calculation of power information for a data cloud.

* * * * *